April 12, 1966     K. ZAIDENER     3,245,239
ANTI-THEFT DEVICE FOR ROAD VEHICLES
Filed Dec. 16, 1963                         2 Sheets-Sheet 1
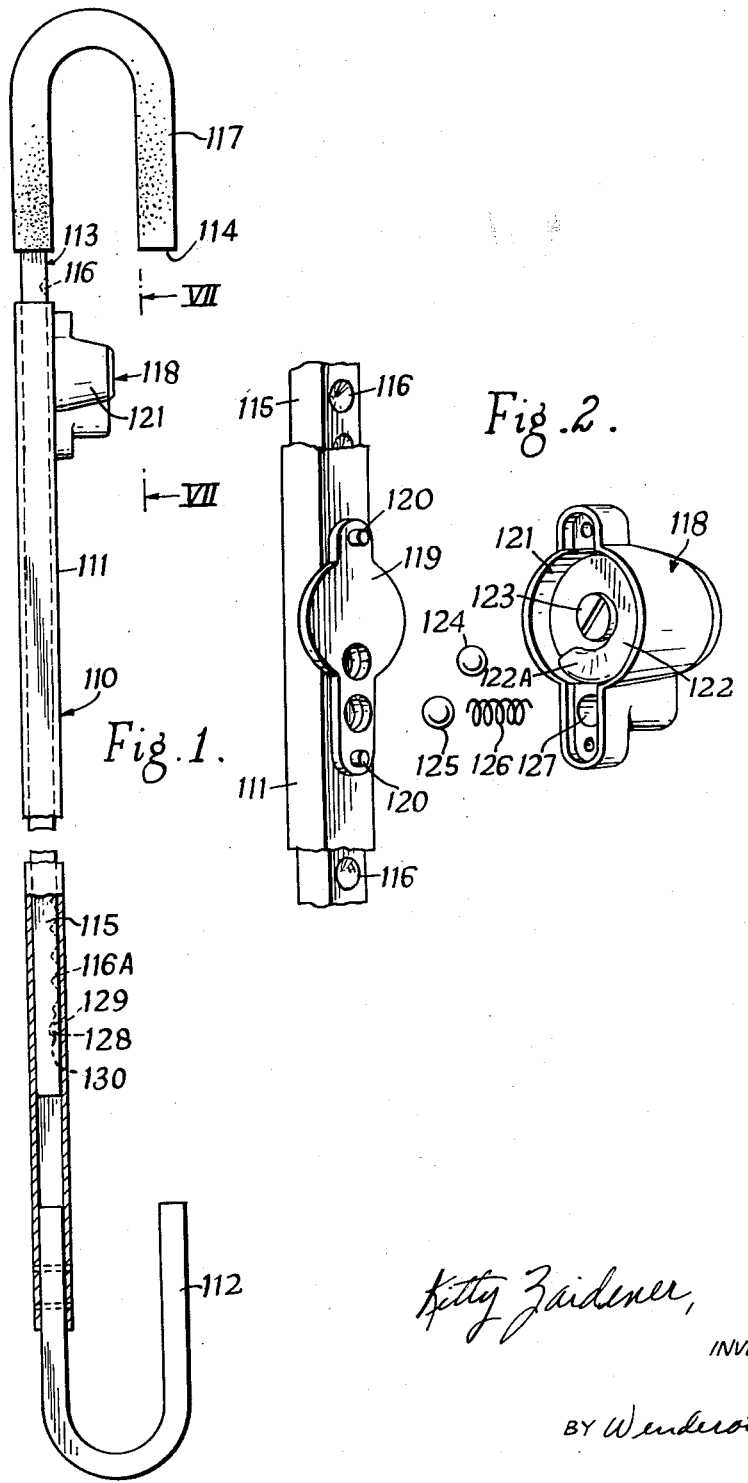
INVENTOR

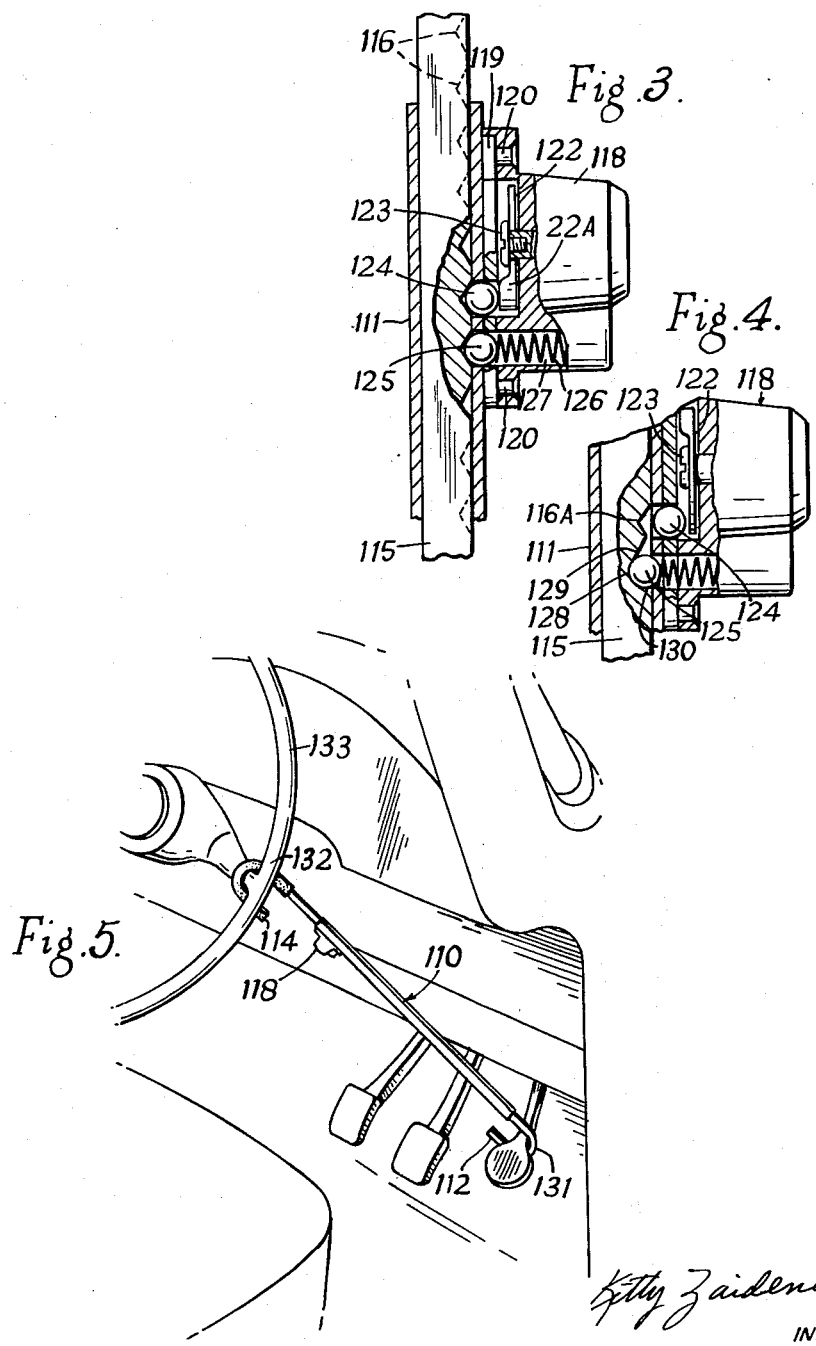

United States Patent Office 3,245,239
Patented Apr. 12, 1966

3,245,239
ANTI-THEFT DEVICE FOR ROAD VEHICLES
Kitty Zaidener, 7 Beresford Lodge, Beresford Road,
London N. 5, England
Filed Dec. 16, 1963, Ser. No. 330,791
Claims priority, application Great Britain, Dec. 27, 1962,
48,692/62; Mar. 7, 1963, 9,188/63
6 Claims. (Cl. 70—202)

This invention relates to an anti-theft device for a road vehicle which is provided with a steering wheel and control pedals.

It is an object of the invention to provide a reliable anti-theft device which is of simple and inexpensive construction and is easy to apply and convenient to store.

The invention provides for a road vehicle having a steering wheel and at least one control pedal, an anti-theft device comprising first and second parts arranged as an elongated telescopic member, an outer end of each of said parts, a first hooked portion provided at the outer end of said first part and arranged to hook round one of said control pedals, a second hooked portion provided at the outer end of said second part and arranged to hook round the rim or spoke of the steering wheel, and locking means for securing the parts of the telescopic member to prevent free movement of said wheel and said control pedal.

The invention further provides for a road vehicle having a steering wheel and at least one control pedal, a first elongated part formed with an axially extending series of recesses, a second elongated part in telescopic relationship with said first part, a free outer end on each of said parts, a hooked portion provided at the outer end of said first part and arranged to hook round one of the control pedals of the vehicle, a hooked portion provided at the outer end of said second part and arranged to hook round a part of the steering wheel of the vehicle, spring-loaded means for engaging said recesses to promote telescopic movement between said parts in a series of steps through a series of positions, and locking means for securing said telescopic parts in one of said positions to prevent free movement of said control pedal and said wheel.

The device has a wide range of application and can be used with vehicles having automatic or semi-automatic transmission. Preferably, the lower end of the rod is arranged to hook round the accelerator pedal however, the lower end may be arranged to hook round the brake pedal or clutch pedal (if any).

Embodiments of the invention will now be described, by way of example, with reference to the accompanying drawings in which:

FIGURE 1 is a part sectional plan view showing the anti-theft device;

FIGURE 2 is an exploded perspective view showing the lock of the device;

FIGURE 3 is a section on the line VII—VII of FIGURE 1 showing the locked arrangement of the device;

FIGURE 4 is a section similar to FIGURE 3 but showing the unlocked arrangement with the device in its position of maximum length; and FIGURE 5 is a perspective view showing the device in use.

Referring to FIGURES 1 to 5 of the drawings, the anti-theft device includes a telescopic member 110 which comprises an elongated square-section tube 111 to one end of which is secured a first hook 112. The hook is secured to the tube by indentation or by means of rivets or the like passing through the two parts. A spigot member in the form of a square-section rod 113 comprising an end hook 114 and a straight length 115 which is formed along one face with a series of recesses 116 and is a sliding fit in the tube 111. The various parts of the device are formed from high quality steel and the hook 114 is covered by a rubber sleeve 117; if desired the hook 112 may also be covered by a rubber sleeve.

A key-operated lock 118 is secured to the tube 111 near the mouth of the tube. To provide a tamper-proof lock and for ease of assembly a shaped base plate 119 (FIG. 2) is secured, for example by welding, to the tube 111, and rivets 120 are provided for attachment of lock body 121 which, when in position, shrouds the plate 119.

A rotary cam disc 122 is connected by a screw 123 to the key-operated mechanism of the lock. The disc 122 is arranged to urge a first steel ball 124 into engagement with a selected recess 116.

A second steel ball 125 is urged into engagement with the recesses 116 by a helical compression spring 126 housed in a bore 127 in the lock body. The bore may be a through bore formed with an outward closure, suitably a screw which can be provided for adjustment of the spring compression.

It will be appreciated that the two balls 124 and 125, which are movable in aligned openings in the plate 119 and the tube 111, together form detent means and are spaced apart by the same distance as that between the recesses 116.

A notch 128 is formed at the inner end of the rod 113. The notch opens from the end recess 116 by the provision of a sloping groove 129 and has an opposed generally upright face 130.

In use of the device, as is illustrated in FIGURE 5, the hook 112 is hooked round a control pedal, for example accelerator 131. The hook 114 is then hooked round the rim or a spoke 132 of steering wheel 133 and the rod 113 is then telescoped into the tube as far as possible, the telescoping movement being stopped by the hook yokes abutting the pedal 131 and the spoke 132.

During the telescoping movement, the spring-loaded ball 125 acts as a detent to promote movement in a series of steps which provides that, when the rod 113 is pushed home, one of the recesses 116 is readily aligned correctly with the ball 124. The lock is of course in the unlocked position, as shown in FIGURE 4 during the telescoping movement and thus the ball is freely movable in its chamber. A key is then applied to turn the lock mechanism and thus the disc 122 turns, through say 180 degrees, to cause the proud part 122A of the disc to push the ball 124 into locking engagement with its aligned recess 116. In this position, which is shown in FIGURE 3, relative movement between the tube and the rod is prevented by the shear resistance of ball 124. With the telescopic parts of the device locked together in their positions of minimum length, free movement of the steering wheel and the clutch pedal is prevented.

Removal of the device is effected by unlocking the lock 118 and drawing out the rod 113. Complete withdrawal is prevented by the ball 125 entering the notch 129 to provide a stop which acts between the upright face 130 and the opposite face of the opening in tube 111. Return movement of the rod 113 is permitted by the ball 125 riding up the sloping face 129.

It will be appreciated that the device can be positioned and removed within a few seconds and that on removal of the device is fully telescoped and can be stored for example under the driving seat.

Modifications may be made to the device. For example although the tube 111 and the rod 115 are shown as straight, it is possible that these parts may be curved to facilitate the fitting of the device in certain vehicles. Also, rod 113 may have a cross section other than rectangular. A non-circular section or a slot-and-pin arrangement is usually preferred, to prevent relative turning of the tube and rod, but a circular section rod may be provided with a series of circumferential recesses if such turning is desired.

It is also envisaged that the shape of the hooks may be altered, and the hook members may even be of the "handcuff" type which can give a very positive hooking effect and may be provided with a lock, possibly combined with the lock 118.

The form of lock may be varied and it is envisaged that in some cases the lock will be of the push-to-lock type, that is, a lock actuated to secure the ball bearing 124 by manually depressing a spring-loaded face part of the lock, whereas unlocking is effected by means of a key which enters the face part.

The lock may be provided on any of the four faces of the tube, but it is usually preferred that the lock is arranged as illustrated, i.e., on the face adjacent the hooked ends which are preferably in the same plane. In a further alternative form of lock the lock body is arranged to straddle or encircle the tube 115. In the latter case, the lock casing may have legs which straddle the tube and are joined at their ends by a metal strap which may be riveted to the legs and to the tube. For economy in axial length this lock should be provided near the mouth of the tube 111.

I claim:

1. For a road vehicle having a steering wheel and at least one control pedal, a portable anti-theft device comprising a first elongated part formed with an axially extending series of generally V-shaped recesses, a second elongated part in substantially axially aligned telescopic relationship with said first part, a free outer end on each of said parts, a hooked portion provided at the outer end of one of said parts and arranged to hook round one of the control pedals of the vehicle, a hooked portion provided at the outer end of the other of said parts and arranged to hook round a part of the steering wheel of the vehicle, detent means in the said second elongated part engageable in said recesses, spring loading means engaging a part of said detent means and urging at least a part of said detent means into said recesses and causing said detent means to cooperate with said recesses for permitting relative movement between said parts in either direction and for promoting telescopic movement between said parts in a series of steps through a series of positions, and locking means engageable with a part of said detent means and holding the detent means in said recesses for securing said telescopic parts in one of said positions to prevent free movement of said control pedal and said wheel.

2. An anti-theft device according to the claim 1, in which said locking means comprises a detent and a cam surface arranged to move part of said detent means into locking engagement with one of said recesses.

3. An anti-theft device according to claim 1, in which said spring loading means comprises a spring bearing on part of said detent means, and said locking means comprises a movable cam surface engaging a part of said detent means which is movable by said cam surface into locking engagement with one of said recesses.

4. An anti-theft device according to claim 3, in which said detent means comprise two detent balls axially aligned and spaced apart in accordance with the axial spacing of said recesses.

5. An anti-theft device according to claim 3, in which said first elongated part comprises a rod, said second elongated part comprises a tube, said locking means are mounted on the tube, and openings are provided in the tube wall to accommodate said detent means.

6. An anti-theft device according to claim 5, in which said rod and said tube are of square section.

References Cited by the Examiner
UNITED STATES PATENTS

| | | | |
|---|---|---|---|
| 1,358,416 | 11/1920 | Carpenter | 70—211 |
| 1,395,970 | 11/1921 | Nidermaier | 70—226 |
| 1,428,649 | 9/1922 | Miller | 70—211 |
| 1,531,062 | 3/1925 | Barranecchia | 70—211 |
| 1,656,776 | 1/1928 | Davidson | 24—206 |
| 2,640,242 | 6/1953 | Weimer | 24—206 |
| 3,072,992 | 1/1963 | Elsner | 24—211 |

FOREIGN PATENTS

| | | |
|---|---|---|
| 751,018 | 6/1933 | France. |
| 463,965 | 6/1951 | Italy. |

JOSEPH D. SEERS, *Primary Examiner.*

BOBBY R. GAY, ALBERT H. KAMPE, *Examiners.*